US009625742B2

(12) United States Patent
Igier et al.

(10) Patent No.: US 9,625,742 B2
(45) Date of Patent: Apr. 18, 2017

(54) OPTICAL ARTICLE COMPRISING A PRECURSOR COATING OF AN ANTI-FOG COATING AND A TEMPORARY LAYER MADE OF METAL FLUORIDES OR COMPOUNDS INCLUDING MAGNESIUM AND OXYGEN

(71) Applicant: ESSILOR INTERNATIONAL (COMPAGNIE GENERALE D'OPTIQUE), Charenton le Pont (FR)

(72) Inventors: Arnaud Igier, Bussy-Saint-Georges (FR); Francis Henky, Couternon (FR); Alexis Theoden, Saint-Maur-des-Fosses (FR); David Robin, Yerres (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 0 days.

(21) Appl. No.: 14/441,441

(22) PCT Filed: Oct. 25, 2013

(86) PCT No.: PCT/FR2013/052554
§ 371 (c)(1),
(2) Date: May 7, 2015

(87) PCT Pub. No.: WO2014/072613
PCT Pub. Date: May 15, 2014

(65) Prior Publication Data
US 2015/0277152 A1    Oct. 1, 2015

(30) Foreign Application Priority Data

Nov. 9, 2012    (FR) ...................... 12 60641

(51) Int. Cl.
| | |
|---|---|
| G02B 7/18 | (2006.01) |
| G02C 11/08 | (2006.01) |
| C03C 17/00 | (2006.01) |
| C03C 17/42 | (2006.01) |
| G02B 1/10 | (2015.01) |

(52) U.S. Cl.
CPC ............ *G02C 11/08* (2013.01); *C03C 17/00* (2013.01); *C03C 17/42* (2013.01); *G02B 1/10* (2013.01); *G02B 1/105* (2013.01); *C03C 2217/734* (2013.01); *C03C 2217/75* (2013.01); *C03C 2217/78* (2013.01); *C03C 2217/948* (2013.01); *C03C 2218/355* (2013.01); *G02C 2202/16* (2013.01)

(58) Field of Classification Search
CPC ...... G02B 1/105; G02B 1/10; G02B 27/0006; G02B 1/12; G02B 1/18; G02B 1/115; Y10T 29/49826; G02C 7/02; G02C 11/08; G02C 2202/16; C03C 17/00; C03C 17/42; C03C 2217/75; C03C 2218/355; C03C 17/30; C03C 2217/73; C03C 2217/734; C03C 2217/76; C03C 2217/78; C03C 2217/948; C03C 2218/31
USPC ....... 351/159.57, 159.73; 359/530, 512, 601, 359/599, 609; 427/162, 154, 165, 385.5, 427/340, 355

See application file for complete search history.

(56) References Cited

U.S. PATENT DOCUMENTS

| | | | |
|---|---|---|---|
| 4,211,823 A | 7/1980 | Suzuki et al. | |
| 5,015,523 A | 5/1991 | Klawashima et al. | |
| 8,142,896 B2 | 3/2012 | Biteau et al. | |
| 8,591,026 B2 | 11/2013 | Conte et al. | |
| 2003/0049370 A1* | 3/2003 | Lacan | C03C 17/00 427/165 |
| 2004/0253369 A1* | 12/2004 | Jallouli | B05D 3/141 427/162 |
| 2006/0246278 A1* | 11/2006 | Lacan | B24B 9/144 428/336 |
| 2009/0141236 A1* | 6/2009 | Chen | A61L 31/10 351/159.57 |
| 2010/0053547 A1 | 3/2010 | Baude et al. | |

(Continued)

FOREIGN PATENT DOCUMENTS

| | | |
|---|---|---|
| EP | 0 614 957 A1 | 9/1994 |
| EP | 1 324 078 A2 | 7/2003 |

(Continued)

OTHER PUBLICATIONS

International Search Report, dated Apr. 9, 2014, from corresponding PCT application.

*Primary Examiner* — Scott J Sugarman
*Assistant Examiner* — Daniele Manikeu
(74) *Attorney, Agent, or Firm* — Young & Thompson

(57) ABSTRACT

Disclosed is an optical article, preferably an ophthalmic lens, including a substrate having at least one main surface and a precursor coating of an anti-fog coating, the precursor coating in direct contact with either the main surface of the substrate, or with a first coating, when the main surface of the substrate is coated with a first coating, the precursor coating being formed by a deposition of at least one hydrophilic compound A on the substrate or on the first coating, including an inner portion in which the compound A is grafted on the substrate or on the first coating, and an outer portion that can be removed by washing and/or wiping, resulting from the deposition of the compound A, and being coated with a temporary layer, in direct contact with the compound, including at least one compound selected from the metal fluorides and the compounds including magnesium and oxygen.

20 Claims, No Drawings

(56) References Cited

U.S. PATENT DOCUMENTS

| | | |
|---|---|---|
| 2010/0247890 A1 | 9/2010 | Habassi et al. |
| 2010/0265459 A1 | 10/2010 | Lacan et al. |
| 2011/0058142 A1* | 3/2011 | Berit-Debat ........... G02B 1/105 |
| | | 351/159.57 |
| 2011/0223418 A1 | 9/2011 | Habassi |
| 2012/0019767 A1 | 1/2012 | Cadet et al. |
| 2012/0272800 A1 | 11/2012 | Lacan et al. |

FOREIGN PATENT DOCUMENTS

| | | |
|---|---|---|
| EP | 1 392 613 B1 | 8/2005 |
| EP | 1 633 684 B1 | 3/2006 |
| FR | 2 858 420 A1 | 2/2005 |
| WO | 03/057641 A1 | 7/2003 |
| WO | 2008/053020 A1 | 5/2008 |
| WO | 2009/071818 A1 | 6/2009 |
| WO | 2010/055261 A2 | 5/2010 |
| WO | 2010/109154 A1 | 9/2010 |
| WO | 2011/080472 A2 | 7/2011 |
| WO | 2012153072 A1 | 11/2012 |

* cited by examiner

OPTICAL ARTICLE COMPRISING A PRECURSOR COATING OF AN ANTI-FOG COATING AND A TEMPORARY LAYER MADE OF METAL FLUORIDES OR COMPOUNDS INCLUDING MAGNESIUM AND OXYGEN

The present invention is concerned with obtaining an optical article, more particularly an ophthalmic lens, the surface of which has been modified in order to enable an effective, easy and lasting application of a temporary antifogging solution. The present invention relates to such an article and to the process for preparing same.

BACKGROUND OF THE INVENTION

Numerous supports, such as plastics and glass, exhibit the disadvantage of becoming covered with fogging when the temperature of their surface falls below the dew point of the ambient air. This is the case in particular with glass, which is used to form windows for transportation vehicles or buildings, mirrors, ophthalmic lenses, such as spectacle lenses, and the like. The formation of fogging on these surfaces leads to a decrease in the transparency, due to the scattering of light by the water drops, which can cause significant nuisance.

In order to prevent the formation of fogging in a very humid environment, that is to say the condensation of minute water droplets on a support, it is possible to deposit, on the external surface of this support, hydrophilic coatings having a low static contact angle with water (typically 10° or less). These permanent antifogging coatings, the hydrophilic properties of which result from hydrophilic compounds permanently bonded to another coating or support, act as sponges with regard to the fogging and make it possible for the water droplets to adhere to the surface of the support by forming a very thin film which gives a sense of transparency. As a result of the absorption of water, they expand, soften and become mechanically weaker.

Another solution, which makes it possible to combine antireflective and antifogging properties, consists in using a thin porous layer having a low refractive index, partially composed of surfactants, which allow the layer to acquire permanent antifogging properties.

A more advantageous alternative to permanent antifogging coatings consists in obtaining an antifogging coating by application of a temporary hydrophilic solution to the surface of a precursor coating for an antifogging coating.

A description has been given, in international patent applications WO 2011/080472 and PCT/FR2012/051044, of the deposition, on the external surface of an optical article coated with a coating comprising silanol groups at its surface, of a hydrophilic precursor coating for an antifogging coating obtained by grafting a compound having a polyoxyalkylene group, in particular an organosilane. The antifogging coating proper, which is a temporary coating, is obtained after application, at the surface of the precursor coating, of a surfactant. Before this application of surfactant, the optical article may be edged (trimmed) satisfactorily if a temporary layer comprising at least 50% by weight of silica has been deposited at its surface. This silica-based temporary layer ensures the adhesion between the attachment member and the surface of the optical article, which makes it possible to hold it firmly during the trimming thereof while avoiding any slipping. It is removed at the end of the edging operation.

In these applications, the precursor coating for the antifogging coating typically has a thickness of less than or equal to 5 nm. This final thickness can be obtained by directly depositing the appropriate amount of organosilane compound.

However, the inventors have found that it is preferable to form the precursor coating for the antifogging coating by depositing an excess of hydrophilic compound at the surface of the coating of the lens, and by removing the excess of this compound, deposited but not grafted, so as to arrive at the same desired final thickness. This procedure guarantees the antifogging performance of the treated lenses. The inventors have indeed found that, when a layer of grafted hydrophilic compound having a thickness which does not require removal of an excess of hydrophilic compound is formed directly, it is possible, in some cases, to obtain an uneven deposited layer and a precursor coating for the antifogging coating, the surface of which does not have a sufficient affinity with regard to a surfactant liquid solution, which results in a coating that does not have the desired antifogging properties, and that is generally less durable. Such reproducibility problems absolutely have to be avoided in order for the production process to be able to be operated industrially.

Depositing a surplus of hydrophilic compound at the surface of the coating of the lens is one technical solution that itself also has drawbacks. The direct removal of the excess ungrafted hydrophilic compound, which is generally carried out by manual wiping, is long, difficult and therefore painful for the operator, which has a negative impact on the productivity, its cost and the motivation of the operator. Since the layer of hydrophilic compound is transparent, it is not possible to visually monitor its removal. Cosmetic problems linked to the difficult removal may also arise. The direct removal of the excess ungrafted hydrophilic compound is therefore one solution that it would be desired to avoid during the industrial manufacture of the lenses.

SUMMARY OF THE INVENTION

The objective of the present invention is the preparation of an optical article, comprising a precursor coating for the antifogging coating, having a thickness preferably of greater than 3 nm, obtained by depositing an excess of hydrophilic compound, the process for the removal of which would be simpler, more effective, faster and more comfortable for the operator, and could be monitored visually.

The invention is also targeted at the development of a process for edging optical articles coated with a precursor coating for an antifogging coating which is reliable and guarantees the success of the edging operation, making it possible to avoid any problem of slipping of the lens during the edging operation in question.

The objectives of the invention are achieved owing to the use of a temporary layer, the composition of which has been specially designed to solve the stated problem. It is intended to be removed rapidly after its deposition at the surface of the "crude" precursor coating for the antifogging coating produced (deposited in excess), and the removal thereof makes it possible to simultaneously remove the excess hydrophilic compound constituting said "crude" precursor coating, surprisingly much more easily and efficiently than the direct removal of the excess of this hydrophilic compound.

Thus, the present invention relates to an optical article comprising a substrate having at least one main surface and a precursor coating for an antifogging coating, said precursor coating being in direct contact either with said main surface of the substrate, or with a first coating, when said main surface of the substrate is coated with a first coating, said precursor coating being formed by depositing at least one hydrophilic compound A on the substrate or, when it is present, on the first coating and comprising an internal part in which said compound A is grafted to the substrate or, when it is present, to the first coating, and an external part that can be removed by washing and/or wiping, resulting from the deposition of the compound A, said precursor coating being coated with a temporary layer, in direct contact with it, comprising at least one compound selected from metal fluorides and compounds comprising magnesium and oxygen. The compounds comprising magnesium and oxygen preferably contain at least one bond between the magnesium and the oxygen and are preferably magnesium oxides. The temporary layer preferably comprises at least 70%, preferably at least 80%, better still at least 90% by weight with respect to the total weight of the temporary layer of at least one compound selected from metal fluorides and compounds comprising magnesium and oxygen.

In the case where a main surface of the optical article is coated with a first coating, the precursor coating for the antifogging coating forms a "second coating".

The invention also relates to a process for manufacturing and edging an optical article comprising a precursor coating for an antifogging coating involving the above optical article.

In the present patent application, a coating which is "on" a substrate/coating or which has been deposited "on" a substrate/coating is defined as a coating which (i) is positioned above the substrate/coating, (ii) is not necessarily in contact with the substrate/coating, that is to say that one or more intermediate coatings may be positioned between the substrate/coating and the coating in question (however, it is preferably in contact with said substrate/coating), and (iii) does not necessarily completely cover the substrate/coating. When "a layer 1 is located under a layer 2", it will be understood that the layer 2 is further from the substrate than the layer 1. Likewise, an "external" layer is further from the substrate than an "internal" layer.

The term "antifogging coating" is understood to mean, in the present patent application, a coating which, when a transparent glass substrate coated with this coating is placed under conditions which bring about fogging on said substrate not equipped with said coating, immediately makes possible a visual acuity $>6/10$ for an observer observing, through the coated glass, a visual acuity chart located at a distance of 5 meters. A test which makes it possible to evaluate the antifogging properties of a coating is described in the experimental part. Under conditions which bring about fogging, the antifogging coatings may either not exhibit fogging at their surface (no visual distortion in the ideal case or else visual distortion but visual acuity $>6/10$ under the measurement conditions indicated above) or may exhibit fogging at their surface but all the same may make possible, despite the disturbance to vision caused by the fogging, a visual acuity $>6/10$ under the measurement conditions indicated above. A non-antifogging coating does not make possible a visual acuity $>6/10$ while it is exposed to conditions bringing about fogging and generally exhibits a veil of condensation under the measurement conditions indicated above.

The term "antifogging glass" is understood to mean, in the present patent application, a glass equipped with an "antifogging coating" as defined above.

Thus, the precursor for the antifogging coating according to the invention, which is a hydrophilic coating, is not regarded as being an antifogging coating within the meaning of the invention. In fact, this precursor for the antifogging coating does not make possible a visual acuity $>6/10$ under the measurement conditions indicated above.

The term "temporary antifogging coating" is understood to mean an antifogging coating obtained after the application of a liquid solution comprising at least one agent that imparts antifogging properties, preferably a surfactant, to the surface of a precursor coating for said antifogging coating. The durability of a temporary antifogging coating is generally limited by actions in which its surface is wiped, the surfactant molecules not being permanently attached to the surface of the coating, but simply adsorbed in a more or less lasting fashion.

The optical article prepared according to the invention comprises a substrate, preferably a transparent substrate, having front and back main faces, at least one of said main faces, preferably both main faces, optionally comprising a first coating preferably comprising silanol groups at its surface. The "back face" of the substrate (the back face is generally concave) is understood to be the face that, when the article is being used, is closest to the eye of the wearer. Conversely, the "front face" of the substrate (the front face is generally convex) is understood to be the face that, when the article is being used, is furthest from the eye of the wearer.

Although the article according to the invention can be any optical article capable of being confronted with the formation of fogging, such as a screen, a window for the motor vehicle industry or the construction industry, or a mirror, it is preferably an optical lens, better still an ophthalmic lens, for spectacles, or a blank for an optical or ophthalmic lens.

This excludes articles, such as intraocular lenses in contact with living tissues or contact lenses, which are not intrinsically confronted with the problem of the formation of fogging.

The first coating of the invention, which preferably comprises silanol groups at its surface, may be formed on at least one of the main faces of a bare substrate, i.e. an uncoated substrate, or on at least one of the main faces of a substrate already coated with one or more functional coatings.

The substrate of the optical article according to the invention can be a mineral or organic glass, for example an organic glass made of thermoplastic or thermosetting plastic.

Classes of substrates which are particularly preferred are poly(thiourethanes), polyepisulfides and the resins resulting from the polymerization or (co)polymerization of alkylene glycol bis(allyl carbonate)s. The latter are sold, for example, under the trade name CR-39® by PPG Industries (Orma® lenses, Essilor).

In some applications, it is preferable for the main surface of the substrate to be coated with one or more functional coatings prior to the deposition of the first coating. These functional coatings conventionally used in optics can, without limitation, be a layer of impact-resistant primer, an abrasion-resistant and/or scratch-resistant coating, a polarized coating, a photochromic coating or a colored coating, in particular a layer of impact-resistant primer coated with an abrasion-resistant and/or scratch-resistant layer.

The first coating may be deposited on an abrasion-resistant and/or scratch-resistant coating. The abrasion-resistant and/or scratch-resistant coating can be any layer conventionally used as abrasion-resistant and/or scratch-resistant coating in the field of ophthalmic lenses.

The coatings resistant to abrasion and/or to scratches are preferably hard coatings based on poly(meth)acrylates or on silanes generally comprising one or more mineral fillers intended to increase the hardness and/or the refractive index of the coating once cured. The term "(meth)acrylate" is understood to mean an acrylate or a methacrylate.

Mention may be made, among the coatings recommended in the present invention, of coatings based on epoxysilane hydrolyzates, such as those described in the patents EP 0 614 957, U.S. Pat. No. 4,211,823 and U.S. Pat. No. 5,015,523. The thickness of the abrasion-resistant and/or scratch-resistant coating generally varies from 2 to 10 μm, preferably from 3 to 5 μm.

It is possible, prior to the deposition of the abrasion-resistant and/or scratch-resistant coating, to deposit, on the substrate, a primer coating which improves the impact resistance and/or the adhesion of the subsequent layers in the final product. These coatings can be any impact-resistant primer layer conventionally used for articles made of transparent polymeric material, such as ophthalmic lenses, and are described in greater detail in patent application WO 2011/080472.

The first coating according to the invention may in particular be an abrasion-resistant and/or scratch-resistant coating or, according to the preferred embodiment, a single-layer antireflective coating or a multilayer antireflective coating. This first coating preferably comprises silanol groups at its surface.

The term "coating comprising silanol groups at its surface" is understood to mean a coating which naturally has silanol groups at its surface or else a coating, the silanol groups of which have been created after it has been subjected to a surface activation treatment. This coating is thus a coating based on siloxanes or on silica, for example, without limitation, a silica layer, a sol-gel coating, based in particular on organosilanes, such as alkoxysilanes, or a coating based on silica colloids. It can in particular be an abrasion-resistant and/or scratch-resistant coating or a single-layer antireflective coating or a multilayer antireflective coating, the external layer of which has silanol groups at its surface. The term "external layer of a stack" is understood to mean the layer furthest from the substrate.

The surface activation treatment optionally employed to create silanol groups or at least to increase their proportion at the surface of a coating is generally carried out under vacuum. It can be a bombardment with energetic and/or reactive species, for example an ion beam (Ion Pre-Cleaning or IPC) or an electron beam, a corona discharge treatment, an ion spallation, a UV treatment or a vacuum plasma treatment. It can also be an acidic or basic surface treatment and/or a treatment with solvents. Several of these treatments may be combined.

The term "energetic species" (and/or "reactive species") is particularly understood to mean ionic species having an energy ranging from 1 to 300 eV, preferably from 1 to 150 eV, better still from 10 to 150 eV and even better still from 40 to 150 eV. The energetic species may be chemical species, such as ions, radicals, or species such as photons or electrons.

The coating comprising silanol groups at its surface is preferably a layer with a low refractive index based on silicon oxide, preferably on silica (comprising silica) and ideally consists of a layer of silica ($SiO_2$), generally obtained by vapor phase deposition. Said silica-based layer preferably has a thickness of less than or equal to 500 nm, better still from 2 to 110 nm and preferentially varying from 5 to 100 nm.

The coating comprising silanol groups at its surface preferably comprises at least 70% by weight of $SiO_2$, better still at least 80% by weight of $SiO_2$ and even better still at least 90% by weight of $SiO_2$. As has been said, in an optimum implementation, it comprises 100% by weight of silica.

The coating comprising silanol groups at its surface can also be a sol-gel coating based on silanes, such as alkoxysilanes, for example tetraethoxysilane, or organosilanes, such as γ-glycidoxypropyltrimethoxysilane. Such a coating is obtained by deposition by the liquid route, using a liquid composition comprising a silane hydrolyzate and optionally colloidal materials with a high (>1.55, preferably >1.60, better still >1.70) or low (≤1.55) refractive index. Such a coating, the layers of which comprise a hybrid organic/inorganic matrix based on silanes, in which matrix are dispersed colloidal materials making it possible to adjust the refractive index of each layer, is described, for example, in the patent FR 2 858 420.

DETAILED DESCRIPTION OF THE PREFERRED EMBODIMENTS

According to one embodiment of the invention, the coating comprising silanol groups at its surface is a silica-based layer deposited on an abrasion-resistant coating, preferably deposited directly on this abrasion-resistant coating.

According to another embodiment of the invention, which constitutes the preferred embodiment, the optical article according to the invention comprises an antireflective coating. When such a coating is present, it generally constitutes the first coating within the meaning of the invention. This antireflective coating can be any antireflective coating conventionally used in the optical field, in particular the field of ophthalmic optics.

An "antireflective coating" is defined as a coating, deposited at the surface of an optical article, which improves the antireflective properties of the final optical article. It makes it possible to reduce the reflection of light at the article/air interface over a relatively broad portion of the visible spectrum.

As is also well known, antireflective coatings conventionally comprise a single-layer or multilayer stack of dielectric materials. These are preferably multilayer coatings, comprising layers with a high refractive index (HI) and layers with a low refractive index (LI).

In the present patent application, a layer of the antireflective coating is said to be a layer with a high refractive index when its refractive index is greater than 1.55, preferably greater than or equal to 1.6, better still greater than or equal to 1.8 and even better still greater than or equal to 2.0. A layer of an antireflective coating is said to be a layer with a low refractive index when its refractive index is less than or equal to 1.55, preferably less than or equal to 1.50 and better still less than or equal to 1.45. Unless otherwise indicated, the refractive indices to which reference is made in the present invention are expressed at 25° C. for a wavelength of 550 nm.

The HI and LI layers are respectively conventional layers with a high refractive index and with a low refractive index well known in the art, the composition, the thickness and the method of deposition of which are described in particular in patent application WO 2010/109154.

Preferably, the total thickness of the antireflective coating is less than 1 micrometer, better still less than or equal to 800 nm and even better still less than or equal to 500 nm. The total thickness of the antireflective coating is generally greater than 100 nm, preferably greater than 150 nm.

Before the formation of the precursor for the antifogging coating on the first coating or on the bare substrate, it is normal to subject the surface of this first coating or of the substrate to a physical or chemical activation treatment intended to increase the adhesion of the precursor for the antifogging coating. These treatments can be chosen from those described above for the activation of the coating comprising silanol groups at its surface.

According to the invention, the first coating, when it is present, is directly in contact with the precursor coating for the antifogging coating. According to another embodiment, the substrate is itself directly in contact with the precursor coating for the antifogging coating, which will now be described.

The term "precursor for an antifogging coating" is understood to mean, in the present patent application, a coating which, by applying a liquid solution containing a surfactant to its surface so as to form a film, constitutes an antifogging coating within the meaning of the invention. The combination formed by the precursor coating and the film of solution based on surfactant constitutes the antifogging coating proper.

The precursor coating for the antifogging coating is formed by depositing at least one hydrophilic compound A in a sufficient amount on the first coating or on the substrate.

The term "hydrophilic compound" is understood to mean a compound of which a film formed at the surface of a substrate has a static contact angle with water of less than or equal to 60°, preferably less than or equal to 55°, better still less than or equal to 50°. In the present patent application, the contact angles are measured in the manner described in patent application WO 2008/053020.

The compound A is a film-forming compound. It preferably comprises at least one group selected from polyoxyalkylene, polyamine, polyol (polyhydroxylated group, for example a polysaccharide or polyglycerol group) and polyether (for example a polyol ether) groups, preferably a polyoxyalkylene group. The compound A generally comprises at least one group capable of establishing a covalent bond with a functional group present on the external surface of the substrate or of the first coating to which it will be grafted, said functional group preferably being a silanol group in the case where a first coating is present. This group, which is a reactive group, can be, without limitation, one of the following groups: an isocyanate, acrylate, methacrylate, haloalkyl, carboxylic acid, sulfonic acid, acyl chloride, chlorosulfonyl, chloroformate or ester group, a silicon atom bearing at least one hydrolyzable group or a group comprising an epoxy functional group, such as the glycidyl group, preferably a silicon atom bearing at least one hydrolyzable group.

The compound A is preferably an organosilane compound, better still an organosilane compound having at least one silicon atom bearing at least one hydrolyzable group, even better still an organosilane compound having a polyoxyalkylene group and at least one silicon atom bearing at least one hydrolyzable group.

Preferably, its polyoxyalkylene chain is functionalized at just one end or at both its ends, ideally at just one end, by at least one, preferably just one, group comprising at least one silicon atom bearing at least one hydrolyzable group. This organosilane compound preferably comprises a silicon atom bearing at least two hydrolyzable groups, preferably three hydrolyzable groups. Preferably, it does not comprise a urethane group. It is preferably a compound of formula:

$$R^1Y_mSi(X)_{3-m} \quad (I)$$

wherein the Y groups, which are identical or different, are monovalent organic groups bonded to the silicon via a carbon atom, the X groups, which are identical or different, are hydrolyzable groups or hydroxyl groups, $R^1$ is a group comprising a polyoxyalkylene functional group and m is an integer equal to 0, 1 or 2. Preferably, m=0.

The X groups are preferably chosen from alkoxy groups —O—$R^3$, in particular $C_1$-$C_4$ alkoxy groups, acyloxy groups —O—C(O)$R^4$, where $R^4$ is an alkyl radical, preferably a $C_1$-$C_6$ alkyl radical, preferably a methyl or ethyl radical, halogens, such as Cl and Br, or the trimethylsiloxy group $(CH_3)_3SiO$—, and the combinations of these groups. Preferably, the X groups are alkoxy groups, in particular methoxy or ethoxy groups and better still ethoxy groups.

The Y group, present when m is not zero, is preferably a saturated or unsaturated hydrocarbon group, preferably a $C_1$-$C_{10}$ hydrocarbon group and better still a $C_1$-$C_4$ hydrocarbon group, for example an alkyl group, such as methyl or ethyl, a vinyl group or an aryl group, for example a phenyl group, which is optionally substituted, in particular by one or more $C_1$-$C_4$ alkyl groups. Preferably, Y represents the methyl group.

According to a preferred embodiment, the compound of formula I comprises a trialkoxysilyl group, such as a triethoxysilyl or trimethoxysilyl group.

The polyoxyalkylene group of the organosilane compound ($R^1$ group) preferably comprises fewer than 80 carbon atoms, better still fewer than 60 carbon atoms and even better still fewer than 50 carbon atoms. The $R^1$ group preferably meets these same conditions.

The $R^1$ group generally has the formula -L-$R^2$, where L is a divalent group bonded to the silicon atom of the compounds of formula I or II via a carbon atom and $R^2$ is a group comprising a polyoxyalkylene group bonded to the L group via an oxygen atom, this oxygen atom being included in the $R^2$ group. Nonlimiting examples of L groups are linear or branched alkylene groups which are optionally substituted, cycloalkylene groups, arylene groups, the carbonyl group, the amido group or combinations of these groups, such as cycloalkylenealkylene, biscycloalkylene, biscycloalkylenealkylene, arylenealkylene, bisphenylene, bisphenylenealkylene or amidoalkylene groups, an example of which is the $CONH(CH_2)_3$ group, or else the —$OCH_2CH(OH)CH_2$— and —$NHC(O)$— groups. The preferred L groups are alkylene groups, preferably linear alkylene groups, preferably having 10 or fewer carbon atoms, better still 5 or fewer carbon atoms, for example the ethylene and propylene groups.

The preferred $R^2$ groups comprise a polyoxyethylene group —$(CH_2CH_2O)_n$—, a polyoxypropylene group or combinations of these groups.

The preferred organosilanes of formula I are compounds of following formula II:

$$Y_m(X)_{3-m}Si(CH_2)_{n'}(L')_{m'}-(OR)_n-O-(L'')_{m''}-R' \quad (II)$$

where R' is a hydrogen atom, an acyl group or an alkyl group which is linear or branched, which is optionally substituted by one or more functional groups and which can additionally comprise one or more double bonds, R is a linear or branched alkylene group, preferably a linear alkylene group, for example an ethylene or propylene group, L' and L" are divalent groups, X, Y and m are as defined above, n' is an integer ranging from 1 to 10, preferably from 1 to 5, n is an integer ranging from 2 to 50, preferably from 5 to 30 and better still from 5 to 15, m' is equal to 0 or 1, preferably 0, and m" is equal to 0 or 1, preferably 0.

The L' and L" groups, when they are present, can be chosen from the divalent groups L described above and preferably represent the —OCH$_2$CH(OH)CH$_2$— group or the —NHC(O)— group. In this case, the —OCH$_2$CH(OH)CH$_2$— or —NHC(O)— groups are connected to the adjacent groups (CH$_2$)$_{n'}$ (in the case of an L' group) and R' (in the case of an L" group) via their oxygen atom (for the —OCH$_2$CH(OH)CH$_2$— group) or via their nitrogen atom (for the —NHC(O)— group).

The —O-(L")$_{m''}$—R' group is preferably an alkoxy group (m"=0, R'=alkyl), ideally a methoxy group.

Preferably, the compounds of formula (I) or (II) comprise just one silicon atom bearing at least one hydrolyzable group.

According to one embodiment, m=0 and the hydrolyzable groups X denote methoxy or ethoxy groups. n' is preferably equal to 3. According to another embodiment, R' denotes an alkyl group having fewer than 5 carbon atoms, preferably the methyl group. R' can also denote an aliphatic or aromatic acyl group, in particular the acetyl group.

Finally, R' can denote a trialkoxysilylalkylene or trihalosilylalkylene group, such as the —(CH$_2$)$_{n''}$Si(R$^5$)$_3$ group, where R$^5$ is a hydrolyzable group, such as the X groups defined above, and n" is an integer such as the n' group defined above. An example of such an R' group is the —(CH$_2$)$_3$Si(OC$_2$H$_5$)$_3$ group. In this embodiment, the organosilane compound comprises two silicon atoms bearing at least one hydrolyzable group.

According to preferred embodiments, n is equal to 3 or else varies from 6 to 9, from 9 to 12, from 21 to 24 or from 25 to 30, preferably from 6 to 9.

Mention may be made, as examples of compounds of formula II, of the 2-[methoxy(polyethyleneoxy)propyl]trimethoxysilane compounds of formulae CH$_3$O—(CH$_2$CH$_2$O)$_{6-9}$—(CH$_2$)$_3$Si(OCH$_3$)$_3$ (III) and CH$_3$O—(CH$_2$CH$_2$O)$_{9-12}$—(CH$_2$)$_3$Si(OCH$_3$)$_3$ (IV), sold by Gelest Inc. or ABCR, the compound of formula CH$_3$O—(CH$_2$CH$_2$O)$_3$—(CH$_2$)$_3$Si(OCH$_3$)$_3$ (VIII), the compounds of formula CH$_3$O—(CH$_2$CH$_2$O)$_n$—(CH$_2$)$_3$Si(OC$_2$H$_5$)$_3$, where n=21-24, 2-[methoxy(polyethyleneoxy)propyl]trichlorosilanes, 2-[acetoxy(polyethyleneoxy)propyl]trimethoxysilane of formula CH$_3$C(O)O—(CH$_2$CH$_2$O)$_{6-9}$—(CH$_2$)$_3$Si(OCH$_3$)$_3$, 2-[acetoxy(polyethyleneoxy)propyl]triethoxysilane of formula CH$_3$C(O)O—(CH$_2$CH$_2$O)$_{6-9}$—(CH$_2$)$_3$Si(OC$_2$H$_5$)$_3$, 2[hydroxy(polyethyleneoxy)propyl]trimethoxysilane of formula HO—(CH$_2$CH$_2$O)$_{6-9}$—(CH$_2$)$_3$Si(OCH$_3$)$_3$, 2-[hydroxy(polyethyleneoxy)propyl]triethoxysilane of formula HO—(CH$_2$CH$_2$O)$_{6-9}$—(CH$_2$)$_3$Si(OC$_2$H$_5$)$_3$, the compounds of formulae HO—(CH$_2$CH$_2$O)$_{8-12}$—(CH$_2$)$_3$Si(OCH$_3$)$_3$ and HO—(CH$_2$CH$_2$O)$_{8-12}$—(CH$_2$)$_3$Si(OC$_2$H$_5$)$_3$, bis[(3-methyldimethoxysilyl)propyl]polypropylene oxide and compounds comprising two siloxane heads, such as bis[(3-triethoxysilylpropoxy)-2-hydroxypropoxy]polyethylene oxide of formula (V), bis[(N,N'-(triethoxysilylpropyl)aminocarbonyl]polyethylene oxide of formula (VI) with n=10-15 and bis(triethoxysilylpropyl) polyethylene oxide of formula (VII):

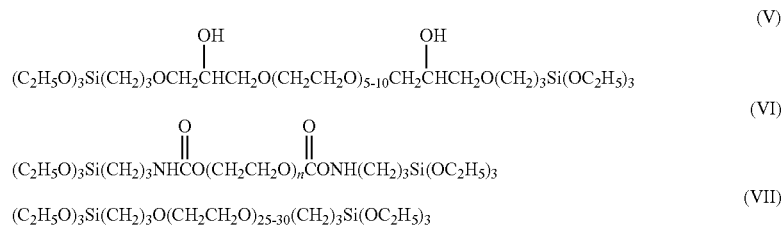

The preferred compounds of formula II are the [alkoxy(polyalkyleneoxy)alkyl]trialkoxysilanes or their trihalo analogs (m=m'=m"=0, R'=alkoxy).

Preferably, the compound A according to the invention does not have a fluorine atom. Typically, the content by weight of fluorine in the precursor coating for the antifogging coating is less than 5% by weight, preferably less than 1% by weight and better still 0% by weight.

Preferably, the molar mass of the compound A according to the invention ranges from 400 to 4000 g/mol, preferably from 400 to 1500 g/mol, better still from 400 to 1200 g/mol and even better still from 400 to 1000 g/mol.

According to one embodiment of the invention, the precursor for the antifogging coating comprises more than 80% by weight, preferably more than 90% by weight, of compound A according to the invention, with respect to the total weight of the precursor for the antifogging coating. According to one embodiment, the precursor for an antifogging coating consists of a layer of said compound A.

Preferably, the precursor for an antifogging coating of the invention comprises less than 5% by weight of metal oxide or metalloid oxide (for example silica or alumina), with respect to the total weight of the coating, and better still does not comprise it. When the organosilane compound used for the formation of the antifogging coating is deposited under vacuum, preferably no metal oxide is coevaporated with it, according to the technique for the coevaporation of at least one organic compound and of at least one inorganic compound described in the application EP 1 324 078.

According to the invention, the deposition of the compound A forms a precursor coating for an antifogging coating comprising an internal part, in which said compound A is permanently (and not by simple adsorption) grafted to the first coating or to the substrate, and an external part which can be removed by washing and/or wiping.

In order to arrive at such a structure, it is necessary to deposit an excess of compound A at the surface of the first coating or of the substrate, preferably comprising silanol groups. Adjusting the deposition parameters in order to arrive at such a configuration is within the scope of a person skilled in the art.

The term "excess" is understood to mean an amount of compound A which is greater than the amount which would be necessary in order to form a layer of compound A grafted to the surface of the first coating or of the substrate.

Thus, the precursor coating for the antifogging coating is a coating preferably having a thickness (before wiping) of greater than or equal to 3 nm, better ≥5 nm, better still ≥8 nm and ideally ≥10 nm. Its thickness is preferably less than 100 nm, better still ≤50 nm and even better still ≤20 nm. It typically ranges from 3 to 100 nm, preferably from 5 to 50 nm.

The deposition of the compound A at the surface of the first coating or of the substrate according to the invention can be carried out according to usual techniques, preferably by gas-phase or liquid-phase deposition, ideally gas-phase deposition, by vacuum evaporation. The compound A can be dissolved beforehand in a solvent before being evaporated, in order to exert better control over the rate of evaporation and of deposition.

According to one of the embodiments of the invention, the precursor coating is deposited by application of a composition comprising a hydrolyzate of the compound A, in the case where the latter is an organosilane. In this case, it is recommended to apply the composition fairly rapidly after hydrolysis, typically less than 2 hours, preferably less than 1 hour, better still less than 30 minutes, after having carried out the hydrolysis (by addition of an acidic aqueous solution, typically of HCl), in order to limit the formation of siloxane prepolymers before grafting. However, it is preferable to deposit said organosilane by the gaseous route.

The external part of the precursor coating for the antifogging coating can be removed by washing and/or wiping, which means that it would be removed by subjecting it in particular to washing with soapy water (containing a surfactant), using a sponge, and then with deionized water, and/or to wiping for typically 20 seconds or less, using a CEMOI™, Wypall™ or Selvith™ cloth which is dry or optionally impregnated with alcohol, typically isopropyl alcohol. This wiping operation can optionally be followed by a further rinsing with deionized water and by a final wiping with a rag.

The precursor for an antifogging coating of the invention preferably has a static contact angle with water of strictly greater than 10° and of strictly less than 50°, preferably less than or equal to 45°, better still ≤40°, even better still ≤30° and ideally ≤25°. This contact angle preferably ranges from 15° to 40°, better still from 20° to 30°. Its surface energy is preferably at least 15 mJ/m$^2$, better still at least 25 mJ/m$^2$. These different values are confirmed by the precursor for an antifogging coating initially deposited (including an excess of compound A) and/or the precursor for an antifogging coating resulting from the removal of the temporary layer of the invention, preferably by both. The surface energies are calculated using the Owens-Wendt method described in the article: "Estimation of the surface force energy of polymers" OWENS D. K, WENDT R. G. (1969) J. APPL-POLYM-SCI, 13, 1741-1747.

After the deposition of the compound A in accordance with the invention, the external part of the coating which can be removed by wiping is not removed, whether by washing or by wiping, or else can be removed but only partially. This precursor coating would thus exhibit problems of adhesion to the holding pad during edging.

A temporary layer according to the invention comprises at least one compound selected from metal fluorides and compounds comprising magnesium and oxygen and is formed directly on the precursor coating for the antifogging coating. Preferably, the temporary layer comprises at least 70% by weight of metal fluorides or of compounds comprising magnesium and oxygen (preferably magnesium oxides), with respect to the total weight of the temporary layer. It preferably comprises at least 70% by weight of metal fluorides or at least 70% by weight of compounds comprising magnesium and oxygen (preferably magnesium oxides), preferably at least 80%, 90% or 95% by weight.

This temporary layer preferably constitutes the external layer of the optical article, that is to say, its layer which is in contact with the air. In a non-preferred manner, other temporary layers based on identical or different materials may be deposited on said temporary layer comprising at least one compound selected from metal fluorides and compounds comprising magnesium and oxygen so as to form, for example, temporary bilayers.

As examples of metal fluorides, mention may be made of magnesium fluoride $MgF_2$, lanthanum fluoride $LaF_3$, aluminum fluoride $AlF_3$, cerium fluoride $CeF_3$, $ZrF_4$, $CaF_2$, $Na_5Al_3F_{14}$, $Na_3AlF_6$, $BaF_2$, $CdF_2$, $HfF_4$, LiF, NaF, $NdF_3$, $PbF_2$, $PrF_3$, $SrF_2$ and $ThF_4$. Preferably, use will be made of magnesium fluoride, $CeF_3$, $Na_5Al_3F_{14}$ or $LaF_3$, ideally magnesium fluoride. Among the compounds comprising magnesium and oxygen, used may be made of magnesium hydroxide $Mg(OH)_2$ or MgO, the latter being preferred. The preferred magnesium oxide is MgO.

This layer preferably comprises at least 80% by weight of at least one compound selected from metal fluorides and compounds comprising magnesium and oxygen, with respect to the total weight of the temporary layer, better still at least 90% and even better still at least 95% by weight. According to one embodiment of the invention, the temporary layer consists of a layer of metal fluorides or of compounds comprising magnesium and oxygen (preferably a layer of magnesium oxides), preferably of $MgF_2$ or MgO.

When the temporary layer does not solely comprise metal fluorides or compounds comprising magnesium and oxygen, it comprises other materials which are preferably dielectric materials such as metal or metalloid oxides or hydroxides, preferably silica or alumina ($Al_2O_3$).

The thickness of the temporary layer according to the invention is preferably ≥5 nm, better still ≥10 nm and preferably ≤200 nm, better still ≤100 nm and even better still ≤50 nm. It typically ranges from 5 to 200 nm, preferably from 5 to 100 nm, better still from 10 to 50 nm.

The temporary layer preferably exhibits a static contact angle with water of less than 50°, better still of less than 40° and even better still of less than 30°. Its surface energy is preferably at least 15 mJ/m$^2$, better still at least 25 mJ/m$^2$.

The temporary layer can be deposited by any suitable conventional process, in the vapor phase (vacuum deposition) or in the liquid phase, for example by spraying, centrifuging or dipping. The temporary layer is preferably deposited by the gaseous route, in particular by vacuum evaporation. This is because the deposition by vacuum treatment makes possible precise control of the thickness of the temporary layer and minimizes the dispersions, which is not necessarily the case with the other technical solutions available. In addition, this vacuum treatment exhibits the advantage of being able to be directly incorporated in the industrial process for the treatment of the optical articles, in particular when the latter are equipped with an antireflective coating.

The temporary layer is preferably formed so that it completely covers the precursor coating for the antifogging coating.

The material of the temporary layer according to the invention does not detrimentally affect the surface properties of the precursor coating for the antifogging coating, and is capable of being removed during a subsequent operation that precedes the edging step. The material of this temporary layer also has sufficient cohesive force so that the withdrawal of the temporary layer is carried out without leaving residues at the surface of the precursor coating for the antifogging coating.

The temporary layer used in the present invention exhibits numerous advantages. It does not affect the transparency of the optical article, so that it remains possible to carry out, on the article coated with this temporary layer, conventional measurements of power by a lensmeter. It can be subjected to marking by means of various marking inks commonly used by a person skilled in the art for varifocal lenses.

The temporary layer according to the invention exhibits the advantage of being able to be very easily removed. The stage of removing this layer is carried out before an optional edging step, which will be described in detail below. It may be carried out either in a liquid medium, or by wiping, in particular dry wiping, or also by a combined use of these two means. This step can be chosen from the abovementioned washing and wiping steps. Other methods for removal in a liquid medium are described in particular in the patent application WO 03/057641. Wiping by means of a cloth or rag is the preferred removal technique. It is preferably carried out manually.

The removal of the temporary layer (and of the excess of compound A deposited) can be monitored visually, since this layer has a colored reflection, if it is not too thin. It is consequently easy to differentiate the wiped surfaces from the non-wiped surfaces.

After removal of the temporary layer, which also results in the removal of the surplus of the compound A deposited, that is to say of the external part of the precursor coating for the antifogging coating which can be removed by wiping, only the internal part of the precursor coating for the antifogging coating comprising the compound A actually grafted remains at the surface of the first coating according to the invention or of the substrate. The ungrafted molecules are thus removed.

The thickness of the precursor coating for the antifogging coating remaining after this removal step is preferably less than or equal to 5 nm, better still less than or equal to 3 nm. The compound A deposited at the surface of the optical article thus preferably forms a monomolecular or virtually monomolecular layer.

One of the main advantages of the use of the temporary layer based on metal fluorides or on compounds comprising magnesium and oxygen is that it makes it possible to facilitate the removal of the excess of compound A deposited by dividing the time needed to carry out this removal by a factor of between 5 and 10. Actually, the direct removal of the excess of compound A deposited at the surface of the first coating or of the substrate, which is generally carried out by manual wiping, is a long and tedious process for the production teams, which may prove painful in the long term. When this excess of compound A and the temporary layer of metal fluorides or of compounds comprising magnesium and oxygen are removed concomitantly, the process is easy, non-painful and rapid (removal time of the order of 5 seconds).

The invention also relates to a process for preparing an optical article, preferably an ophthalmic lens, as defined above, comprising:

a) providing a substrate having at least one main surface,
b) depositing, preferably by vacuum evaporation, on said main surface of the substrate or on a first coating, when said main surface of the substrate is coated with a first coating, at least one hydrophilic compound A, so as to obtain a precursor coating for an antifogging coating that comprises an internal part in which said compound A is grafted to the substrate or, when it is present, to the first coating, and an external part that can be removed by washing and/or wiping,
c) depositing directly on the precursor coating for the antifogging coating, preferably by vacuum evaporation, at least one temporary layer comprising at least one compound selected from metal fluorides and compounds comprising magnesium and oxygen,
d) removing said temporary layer and the external part of the precursor coating for an antifogging coating, preferably by washing and/or wiping.

Preferably, the temporary layer comprises at least 70% by weight of at least one compound selected from metal fluorides and compounds comprising magnesium and oxygen, with respect to the total weight of the temporary layer.

The process of the invention may furthermore comprise the following steps, carried out after the removal of the excess of compound A deposited, which make it a process for edging (or trimming) an optical article:

e) attaching the optical article resulting from step d) to a holding device, preferably by means of an adhesive pad which adheres to the surface of the optical article (blocking);
f) mounting the holding device to which the optical article adheres, preferably via the adhesive pad, in an edging device;
g) edging the optical article by machining the periphery (or the edge) of the optical article; and
h) recovering the edged optical article (deblocking).

In the case where the optical article is an ophthalmic lens, the edging operation makes it possible to shape it to the dimensions and to the shape of the spectacle frame in which it is intended to be fitted.

The edging is generally carried out on a grinder comprising diamond wheels which carry out the machining as defined above. The lens is held, during this operation, by axially acting clamping devices.

For this, before the edging operation, a blocking operation is carried out on the optical article, that is to say that a holding means or block will be positioned on its surface (generally its convex surface). Typically, a holding pad (or fixing pad), such as a self-adhesive disk, for example a double-sided adhesive pad, is positioned between the block and the surface of the optical article. The block to which the optical article adheres via the adhesive pad is then mechanically fixed in the mounting axis of the grinder and an axial arm will lock the optical article by applying a central force to the face of the optical article opposite the block. During the machining, a tangential torque force is generated on the optical article.

In the process of the invention, the optical article is firmly held during the edging operation, since its external surface, in contact with the holding pad, is at this stage a hydrophilic surface (namely the surface of the precursor for the antifogging coating), which enables a good adhesion, both normal and tangential, to the holding pad/(convex) surface of the optical article interface. Therefore, a reliable edging is carried out by avoiding the phenomena of slipping and offsetting, and also the phenomenon of untimely deblocking. This process provides optical articles which have undergone a maximum offsetting of 2° and optimally of less than or equal to 1°.

The blocking and deblocking steps and the holding systems which can be used during this process, which are conventional for a person skilled in the art, are described in more detail in the patent applications EP 1 392 613 and WO 2010/055261.

It therefore appears that the role of the layer based on metal fluorides or on compounds comprising magnesium and oxygen of the invention is clearly different from that of the temporary layers of metal fluorides (typically $MgF_2$) or of magnesium oxide used for example in patent applications EP 1 392 613, EP 1 633 684 and WO 03/057641. In these applications, the temporary layers based on metal fluorides or on magnesium oxide are formed at the surface of optical articles coated with hydrophobic (generally fluorinated) external layers in order to facilitate the edging thereof. According to the invention, the temporary layers based on metal fluorides or on compounds comprising magnesium and oxygen are deposited at the surface of optical articles coated with hydrophilic external layers and do not have the objective of facilitating the edging thereof. The term "hydrophobic coating" is understood to mean a coating that has a static contact angle with water of greater than 60°, preferably of greater than or equal to 70°, better still of less than or equal to 90°.

The process of the invention may also comprise an additional stage of deposition of a film of a liquid solution comprising at least one surfactant at the surface of the precursor coating for the antifogging coating obtained after the removal of the temporary layer and of the external part of the precursor coating for the antifogging coating which can be removed by wiping, thus giving access to a temporary antifogging coating.

An optical article having excellent antifogging properties is thus recovered, which means that the temporary layer according to the invention does not exert any negative effect on the antifogging properties of the article. Neither does it affect the durability of the properties of the antifogging coating.

This solution provides the lenses with temporary protection against fogging by creating a uniform layer at their surface which helps in dispersing the water droplets over the surface of the lens so that they do not form visible fogging.

The application of the surfactant solution can be carried out by any known technique, in particular by dipping, centrifuging or spraying.

The surfactant solution is preferably applied by deposition of a drop of this solution at the surface of the precursor for the antifogging coating and by then spreading it so as to cover preferably all of said precursor coating. The surfactant solution applied is generally an aqueous solution, preferably comprising from 0.5% to 10% by weight, better still from 2% to 8% by weight, of surfactant.

A great variety of surfactants can be employed. These can be ionic (cationic, anionic or amphoteric) or nonionic, preferably nonionic or anionic. However, a mixture of surfactants belonging to these different categories can be envisaged. Preferably, use is made of a surfactant comprising poly(oxyalkylene) groups. A commercially available surfactant solution for conferring an antifogging property is the Optifog™ Activator solution from Essilor.

The antifogging coating of the invention preferably exhibits a static contact angle with water of less than or equal to 10°, better still of less than or equal to 5°.

The following examples illustrate the invention in more detail but without implied limitation. Unless otherwise indicated, all the thicknesses appearing in the present patent application are physical thicknesses.

EXAMPLES

1. Materials and Optical Articles Used

The organosilane compound A used in the examples to form the precursor for the antifogging coating is 2-[methoxy (polyethyleneoxy)propyl]trimethoxysilane having from 6 to 9 ethylene oxide units, of formula (III) and with a molar mass of 450-600 g/mol (CAS No.: 65994-07-2, Ref: SIM6492.7, supplied by Gelest Inc.).

The vacuum evaporation device which makes it possible to deposit the different layers (antireflective, precursor coating for the antifogging coating, temporary layer) is a Satis 1200 DLF device (start-up pressure, at which the process will start: $3.5 \times 10^{-3}$ Pa).

The lenses used in the examples according to the invention comprise a lens substrate made of poly(bisphenol A carbonate) (correction −8.00 diopters, +2.00 cylinder) comprising, on each of its faces, a polyurethane impact-resistant primer with a thickness of the order of 1 micron, itself coated with an abrasion-resistant coating with a thickness of the order of 3 microns by depositing and curing a composition as defined in example 3 of the patent EP 614 957, in its turn coated with an antireflective coating comprising five layers $ZrO_2/SiO_2/ZrO_2/ITO/SiO_2$ deposited on the abrasion-resistant coating by vacuum evaporation of the materials in the order in which they were mentioned (respective thicknesses of the layers: 29, 23, 68, 6.5 and 85 nm, respective deposition rates: 0.32, 0.7, 0.32, 0.13, 1.05 nm/s). The $ZrO_2$ layers are deposited with introduction of passive $O_2$ ($6 \times 10^{-3}$ Pa) without ion assistance. The ITO layer is deposited under ion assistance of oxygen ions (2 A, 120 V), without contribution of passive $O_2$. An ITO layer is an electrically conducting layer of indium oxide doped with tin ($In_2O_3$:Sn).

Before the deposition of the antireflective coating, the lenses comprising the abrasion-resistant coating are subjected to a surface activation (IPC) treatment, which consists in carrying out an ion bombardment with argon ions, under vacuum, at a pressure typically of $3.5 \times 10^{-5}$ mbar (1 minute, 3 A, 150 V).

In the examples, the antireflective coating is not subjected to any activation treatment before the deposition of the precursor for the antifogging coating.

2. Vapor-Phase Deposition of the Precursor for the Antifogging Coating

The deposition is carried out on the antireflective coating of the lenses by vacuum evaporation using a Joule-effect heat source. 150 μl of siloxane compound of formula (III) are poured into a copper dish and this dish is deposited on a heating support made of conducting tantalum. The evaporation pressure of the siloxane compound of formula (III) generally varies from $5 \times 10^{-4}$ to $8 \times 10^{-4}$ Pa (deposition rate: 0.3 nm/s). A layer with a thickness of 9 to 15 nm depending on the tests (thickness greater than that of a grafted layer, which therefore includes the surplus of siloxane compound), having a static contact angle with water of 13°, is obtained.

3. Deposition of the Temporary Layer

A temporary layer of $MgF_2$ in accordance with the invention with a thickness of 20 nm was formed on the precursor coating for the antifogging coating described above by vacuum evaporation in a vacuum chamber (deposition rate: 0.7 nm/s, $P = 3 \times 10^{-3}$ Pa, without contribution of passive gas or ion assistance, total deposition time: around 1 minute). Ophthalmic lenses exhibiting a blueish appearance (which will disappear after wiping and/or washing) are obtained. Other colors are possible depending on the thickness and the refractive index of the temporary layer.

4. Removal of the Temporary Layer and of the Excess of Hydrophilic Compound by Wiping The temporary layer and the excess of compound A which are not grafted are wiped manually using a dry rag of Wypall™ type and easily removed (in 5 seconds, without pain for the operator), which makes it possible to obtain a lens comprising, as external layer, a precursor coating for the antifogging coating grafted to the surface of the lens, which exhibits no cosmetic defect (in particular, no greasy appearance).

The removal of the layer of metal fluorides may be monitored visually, since this layer is slightly colored.

It has furthermore been verified by XPS (X-Ray Photoelectron Spectroscopy, on a Kratos Nova machine, source: monochromatized Al Kα, detection angle: normal (θ=0°), depth analyzed: less than 10 nm, area analyzed: 300×700 µm$^2$, 225 Watt) that after gentle wiping (a small amount of finger pressure on the region to be wiped in order to remove the layer of $MgF_2$) with the dry rag, no trace of the elements F or Mg initially present at the surface of the lens remains (detection threshold: 0.1 atomic %, reproducibility <3%). This proves that gentle wiping is sufficient:

| atomic % | Mg | F | Si | O | C | F/Mg ratio |
|---|---|---|---|---|---|---|
| Unwiped lens | 20.1 | 43.2 | 2.0 | 11.8 | 22.9 | 2.1 |
| Wiped lens | — | — | 22.3 | 51.7 | 26.0 | — |

The use of a temporary layer based on metal fluorides simplifies the removal of the excess of hydrophilic compound A deposited. The increase in productivity during the removal step is around 40 seconds per lens. Besides articles comprising the temporary layer of $MgF_2$ described above, other articles were prepared, comprising temporary layers of $CeF_3$, $Na_5Al_3F_{14}$, $LaF_3$ and MgO. Other articles comprising a second temporary layer, deposited by vacuum evaporation, of $SiO_2$, L5 (mixture of $SiO_2$ and $Al_2O_3$ sold by Umicore Materials AG), $SnO_2$ or $Al_2O_3$ deposited on the temporary layer of $MgF_2$ described above were also prepared. This temporary bilayer has a behavior similar to the temporary layer of $MgF_2$ with regard to the removal thereof by wiping.

In the absence of these temporary layers, the wiping is much longer (duration of the order of 50 seconds), since, in order to achieve a complete removal of the excess of compound A deposited, it requires wiping for several seconds with a dry rag of Wypall™ type, then using a Cémoi cloth and finally with isopropyl alcohol, which leaves traces on the lenses. Gentle wiping is not sufficient, it is necessary to powerfully wipe the lens, which causes pain to the operator (hands, fingers). Moreover, the lens obtained has a greasy surface.

Furthermore, the wiping is sometimes random, since it is not possible, in the absence of a temporary layer, to visually detect which places have not been wiped, since the organosilane compound A forms a transparent layer.

By way of comparison, a temporary layer consisting of alumina is difficult to remove with a dry or wet rag.

5. Formation of the Antifogging Coating and Evaluation of the Performance Thereof The Optifog™ Activator solution, sold by Essilor, containing surfactants (polyethylene glycols in solution in isopropanol), is applied just once to the surface of the lens obtained in §4.

The lens is then placed for 24 hours in an environment that is temperature regulated (20-25° C.) and is at a humidity of 50%, then placed for 15 seconds above a heated receptacle containing water at 55° C. Immediately afterwards, a visual acuity chart located 5 m away is observed through the lens tested. An observer who has 10/10 vision and who has the lens placed in front of his eye obtains a visual acuity of 10/10$^{th}$ (in transmission, Snellen optotype chart placed 5 meters away, Armaignac Tridents, ref. T6 chart available from FAX INTERNATIONAL), and no fogging or visual distortion is observed. This test makes it possible to simulate the conditions of ordinary life where a wearer places his face above his tea, coffee or a saucepan of boiling water.

It should be noted that materials such as alumina or tin oxide, when they are used pure, as temporary layer, are harmful to the antifogging performance of the lens, which might be explained by the precursor for an antifogging coating being contaminated or torn off during the removal of the temporary layer.

6. Edging of the Lens

The lens obtained in §4 is edged on an Essilor Kappa grinder. During this operation, the adhesive holding pad employed (Leap II with a diameter of 24 mm, GAM200 from 3M) is directly in contact with the surface of the grafted precursor for the antifogging coating. The lens according to the invention does not undergo any offsetting (the protocol for measuring the offsetting undergone by the lenses during this operation is described in detail in patent application WO 2009/071818).

It should be noted that, unlike the temporary layers of $MgF_2$ or of silica described in patent applications PCT/FR2012/051044, EP 1 392 613, EP 1 633 684 and WO 03/057641, the presence of which at the surface of the optical article is imperative during the edging step, the temporary layer of $MgF_2$ of the invention, deposited on an excess of ungrafted organosilane compound A, is removed before carrying out the edging operation, since the hold of the holding pad to the surface of this layer is poor, causing an untimely deblocking during the edging operation. Thus, the lens obtained in §3 fails during a deblocking test that consists in observing the hold of a block+holding pad assembly adhesively bonded to the convex face of the lens, this assembly being subjected to sprinkling with faucet water (water at 25° C.) for 45 seconds, so as to reproduce the exposure to the water commonly used during the edging operation.

It should also be noted that the direct edging of the lens obtained in §2 (lens comprising, as external layer, a precursor for the antifogging coating deposited in excess with no temporary layer) cannot be carried out either, which does not enable good holding of the pad and leads to slipping of the article during the edging operation.

The invention claimed is:
1. An optical article, comprising:
a substrate having at least one main surface and a precursor coating for an antifogging coating, said precursor coating being in direct contact either with said main surface of the substrate, or with a first coating, when said main surface of the substrate is coated with a first coating, said precursor coating being formed by depositing at least one hydrophilic compound A on the substrate or, when it is present, on the first coating,
wherein said precursor coating comprises an internal part in which said compound A is grafted to the substrate or, when it is present, to the first coating, and an external part that can be removed by washing and/or wiping, resulting from the deposition of the compound A, and wherein said precursor coating is coated with a temporary layer, in direct contact with it, comprising at least one compound selected from the group consisting of metal fluorides and compounds comprising magnesium and oxygen.

2. The optical article of claim 1, wherein the temporary layer comprises at least 70% by weight of at least one compound selected from metal fluorides and compounds comprising magnesium and oxygen, with respect to the total weight of the temporary layer.

3. The optical article of claim 1, wherein the temporary layer comprises at least one compound selected from metal fluorides and magnesium oxides.

4. The optical article of claim 1, wherein the temporary layer comprises at least 70% by weight of MgF2, with respect to the total weight of the temporary layer.

5. The optical article of claim 1, wherein the temporary layer consists of a layer of $MgF_2$.

6. The optical article of claim 1, wherein the temporary layer forms the external layer of the optical article.

7. The optical article of claim 1, wherein the temporary layer has a thickness ranging from 5 to 200 nm.

8. The optical article of claim 1, wherein the precursor coating for the antifogging coating has a thickness ranging from 3 to 100 nm.

9. The optical article of claim 1, wherein the compound A contains at least one polyoxyalkylene group.

10. The optical article of claim 1, wherein the compound A is an organosilane having at least one silicon atom bearing at least one hydrolyzable group.

11. The optical article of claim 10, wherein the organosilane compound is a compound of formula:

$$R^1Y_mSi(X)_{3-m} \quad (I)$$

wherein the Y groups, which are identical or different, are monovalent organic groups bonded to the silicon via a carbon atom, the X groups, which are identical or different, are hydrolyzable groups or hydroxyl groups, R1 is a group comprising a polyoxyalkylene functional group and m is an integer equal to 0, 1 or 2.

12. The optical article of claim 1, wherein the precursor coating for the antifogging coating has a surface energy of greater than or equal to 15 mJ/m².

13. The optical article of claim 1, wherein at least one of the main surfaces of the substrate is coated with a first coating, said first coating being a single-layer or multilayer antireflective coating, or an abrasion-resistant and/or scratch-resistant coating.

14. The optical article of claim 1, wherein the optical article is an optical lens.

15. A process for preparing an optical article, comprising:
a) providing a substrate having at least one main surface,
b) depositing, on said main surface of the substrate or on a first coating, when said main surface of the substrate is coated with a first coating, at least one hydrophilic compound A, so as to obtain a precursor coating for an antifogging coating that comprises an internal part in which said compound A is grafted to the substrate or, when it is present, to the first coating, and an external part that can be removed by washing and/or wiping,
c) depositing directly on the precursor coating for the antifogging coating at least one temporary layer comprising at least one compound selected from the group consisting of metal fluorides and compounds comprising magnesium and oxygen,
d) removing said temporary layer and said external part of the precursor coating for an antifogging coating.

16. The process of claim 15, further comprising the following steps:
e) attaching the optical article resulting from step d) to a holding device;
f) mounting the holding device to which the optical article adheres in an edging device;
g) edging the optical article by machining the periphery or the edge of the optical article; and
h) recovering the edged optical article.

17. The process of claim 15, wherein the thickness of the precursor coating for the antifogging coating, after the removal of the temporary layer, is less than or equal to 5 nm.

18. The process of claim 15, wherein the temporary layer comprises at least 70% by weight of at least one compound selected from metal fluorides and compounds comprising magnesium and oxygen, with respect to the total weight of the temporary layer.

19. The process of claim 15, wherein the temporary layer comprises at least one compound selected from metal fluorides and magnesium oxides.

20. The process of claim 15, wherein the temporary layer comprises at least 70% by weight of $MgF_2$, with respect to the total weight of the temporary layer.

* * * * *